United States Patent
Van Bergen

[11] 3,720,157
[45] March 13, 1973

[54] WEIGHT COMPENSATOR FOR BARBECUE SPITS

[76] Inventor: Frederick H. Van Bergen, 2005 Argonne Drive, Minneapolis, Minn. 55421

[22] Filed: May 13, 1971

[21] Appl. No.: 142,918

[52] U.S. Cl...................................99/421 H, 74/573
[51] Int. Cl..............................................A47j 37/04
[58] Field of Search .....99/421, 340, 427; 16/1; 64/1; 73/66, 458, 468, 469, 470; 74/61, 573; 248/274, 364; 310/51

[56] References Cited

UNITED STATES PATENTS

| 525,799 | 9/1894 | Rymes | 74/573 |
|---|---|---|---|
| 1,503,431 | 7/1924 | Schein | 74/573 X |
| 3,143,003 | 8/1964 | Schmitt | 99/421 H X |
| 394,435 | 12/1888 | Baumann | 73/469 X |
| 1,361,183 | 12/1920 | Reed | 99/421 H UX |
| 3,502,019 | 3/1970 | Koons, Jr. | 99/421 R |
| 3,298,247 | 1/1967 | Juno | 99/421 H |

Primary Examiner—Robert W. Jenkins
Assistant Examiner—Arthur O. Henderson
Attorney—Merchant & Gould

[57] ABSTRACT

A weight compensator for barbecue spits is shown. The device can be securely attached to any known spit configuration, but yet adjusted to any selected position around the spit. A sleeve is secured to the spit by a set screw. A rotatable collar is mounted on the sleeve. A spoke-like rod is attached to the collar and carries an adjustable weight. A set screw is provided to lock the collar to the sleeve at any selected position on the circumference of the sleeve.

9 Claims, 6 Drawing Figures

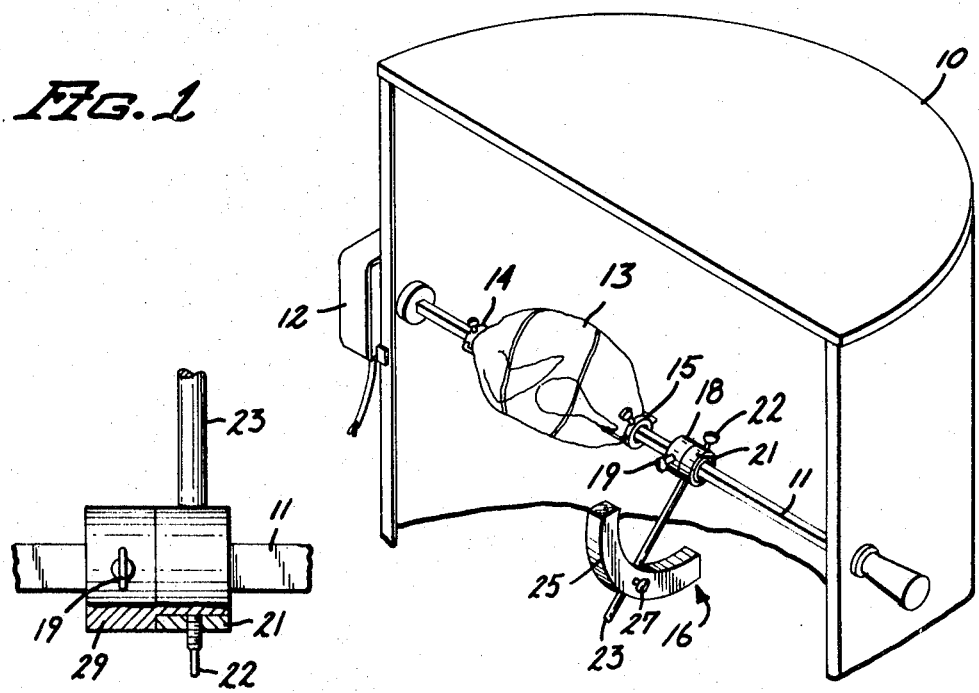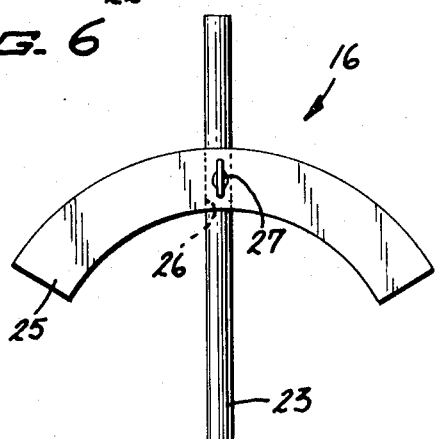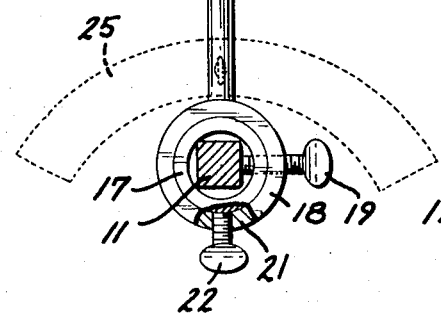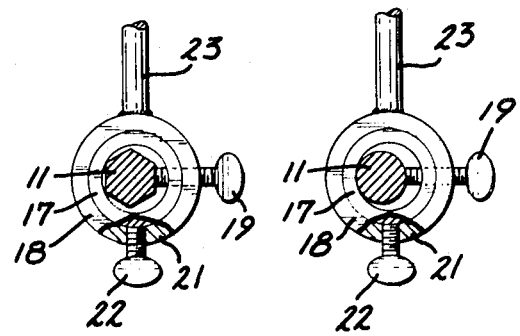

WEIGHT COMPENSATOR FOR BARBECUE SPITS

BACKGROUND OF THE INVENTION

1. Field of the Invention

This invention relates generally to apparatus for counter-balancing rotating shafts, and more particularly relates to a device for balancing rotating barbecue spits having improved means for mounting the device on the spit and a unique form of counter-weight.

2. Description of the Prior Art

When foods such as turkeys or roasts are cooked on a rotisserie, it is very difficult to insert the spit so that the food item is evenly balanced. If the food item is not evenly balanced, the spit will not rotate at an even speed, causing uneven cooking of the meat. Such unbalance may also cause damage to the motor gearing. To overcome this problem, the prior art has suggested that weights be attached to the barbecue spit to evenly balance the load around the spit. The Schmitt U.S. Pat. No. 3,143,003 that issued Aug. 4, 1964 discloses a counter-balance unit having a cylindrical sleeve that loosely fits over the spit, a threaded rod that extends through a threaded opening in the sleeve to tightly engage the spit between the end of the rod and an inner wall of the sleeve, and one or more weights threadably engaging the rod for adjustments along the length thereof. A major problem with this type of device is that it cannot be adjusted to an infinite number of positions around the barbecue spit unless the barbecue spit has a circular cross section. If the barbecue spit has a rectangular or hexagonal cross section, for example, there are only a limited number of positions at which the device can be locked around the spit. In such cases it may be impossible to correctly counter-balance the weight of the meat on the spit. If the spit has a square cross section, there may be a total of eight positions at which the Schmitt device can be mounted. These positions are 45° apart. Therefore, it may be necessary with the Schmitt device to locate the counter-balance unit as much as 22½° away from the optimum position. The optimum position is of course 180° from the center of mass of the item on the spit.

Another problem with devices like the Schmitt device is that there is no neutral position of the weight. The effect of the weight can be reduced by moving it closer to the spit, but it can never reach a substantially neutral position.

Other prior art devices having the same limitations are shown in the Rymes U.S. Pat. No. 525,799 that issued Sept. 11, 1894 and the Koons, Jr. U.S. Pat. No. 3,502,019 that issued Mar. 24, 1970. Neither of these devices can be adjusted to an infinite number of positions around spits having all types of cross sectional configurations and neither can be adjusted to substantially a null position.

SUMMARY OF THE INVENTION

The first important feature of the present invention is that it can be locked at an infinite number of positions around the periphery of the spit so that the counter-weight is located directly opposite the center of mass of the meat item on the spit. To accomplish this unique function, a cylindrical sleeve is locked to the spit by means of a set screw. A rotatable collar is then mounted on the sleeve and another set screw is provided to lock the collar to the sleeve. Thus, the inner sleeve can be locked at any secure position with respect to any type of spit and the collar can then be adjusted with respect to the sleeve. Because the sleeve has a circular cross section, the collar can be adjusted to any circumferential position on the sleeve. The collar supports the spoke-like rod and the adjustable weight.

Another important feature of the present invention is that the weight is in the form of a segment of a circular metal ring. The segment can be locked at any position along the length of the rod, including a position adjacent the collar where the legs of the segment generally extend around the collar. In this position adjacent the collar, the weight of the segment is distributed substantially around the spit so that it exerts very little torque on the spit. In this position, the curved weight has virtually no counter-balancing effect. This feature is desirable because in some instances, the meat on the spit becomes better balanced as the cooking progresses because of fat loss, etc. If the meat should become perfectly balanced during the cooking process, it would be undesirable to have the counter-balance unit exert any torque on the spit. With the present invention, the torque effect can be substantially eliminated by moving the curved weight to a point closely adjacent the collar.

BRIEF DESCRIPTION OF THE DRAWINGS

FIG. 1 is a perspective view of a barbecue grill having a motor-driven rotisserie spit, the counter-balance unit of the present invention being mounted on the spit;

FIG. 2 is a plan view of the counter-balance unit, mounted on a spit having a square cross section, portions thereof being broken away;

FIG. 3 is a fragmentary view of the sleeve and locking collar portion of the device, portions thereof being broken away;

FIG. 4 is a fragmentary end view of the sleeve and locking collar portion, mounted on a spit having a hexagonal cross section, portions thereof being broken away;

FIG. 5 is a similar end view, the device being mounted on a circular spit; and

FIG. 6 is a view similar to FIG. 3, showing a modified form of the invention.

DESCRIPTION OF THE PREFERRED EMBODIMENTS

Referring now to the drawings, wherein like numerals are used throughout the several views to identify like elements of the invention, there is disclosed in FIG. 1 the hood 10 for a barbecue grill. Extending between and through the walls of the hood 10 is a rotatable rotisserie spit 11 driven by an electric motor 12. A turkey 13 is skewered on spit 11 in the usual fashion, and is held in place by a pair of clamps 14 and 15.

Because it is so difficult to accurately balance turkey 13 on spit 11, I have provided a weight compensator 16. As best shown in FIGS. 2 and 3, compensator 16 includes a cylindrical sleeve 17, the outer surface of which is circular in cross section, and the inner bore of which is also circular in cross section. The bore of sleeve 17 is larger than the widest cross dimension of spit 11. In the preferred embodiment of my invention, sleeve 17 is constructed from stainless steel.

Mounted on sleeve 17 is a fixed, cylindrical collar 18, the bore of which is circular in cross section and just slightly larger in diameter than the outer diameter of sleeve 17. Thus, collar 18 snugly fits on sleeve 17. In the preferred embodiment, collar 18 is made from brass and its length is approximately one-half the length of sleeve 17. Collar 18 is provided with a threaded opening in which is threadedly mounted a set screw 19 that also extends through an opening in sleeve 17 to engage the side of spit 11. As shown in FIG. 2, set screw 19 is tightened against spit 11 to force it against the opposite inner wall of sleeve 17, to securely lock sleeve 17 on spit 11. As shown in FIGS. 4 and 5, sleeve 17 and collar 18 can be secured to spits having other cross sectional configurations, such as hexagonal (FIG. 4) and circular (FIG. 5).

Also mounted on sleeve 17 is a rotatable collar 21 substantially equal in size and configuration to collar 18. Collar 21 is also provided with an opening in which a set screw 22 is threadedly engaged. In this case, however, sleeve 17 is not provided with a corresponding opening and set screw 22 is used to lock collar 21 in a selected position with respect to sleeve 17. Because collar 21 is freely rotatable on sleeve 17, it can be locked at any one of an infinite number of positions around the circumference of spit 11.

Extending radially outwardly from collar 21 is a spoke-like metal rod 23. One end of rod 23 is welded to collar 21.

Mounted on rod 21 is a curved metal weight 25. Preferably, weight 25 is a segment of a generally circular metal ring. Weight 25 is provided with a rod receiving opening 26 generally equidistant from the opposite ends thereof. Opening 26 is positioned such that rod 23 lies along a radius of the segment 25, which would also be along the radius of the imaginary ring from which the segment 25 is taken. A set screw 27 extends through and is threadedly engaged with an opening in weight 25 that leads to rod receiving opening 26. Set screw 27 is used to lock weight 25 in a selected position along rod 23.

To adjust the weight compensator 16, the turkey or other food is placed on the spit 11 and the spit is allowed to freely rotate to a rest position. If the center of gravity of the turkey is not on the axis of the spit, the spit will automatically rotate until the center of gravity or center of mass is located below the spit. Collar 21 is then rotated on sleeve 17 until rod 23 extends directly upwardly from the spit, which should be 180° from the position of the center of gravity. Collar 21 is then locked in that position. The weight 25 is then moved to a position on rod 23 to exactly compensate for the opposite unbalance of the turkey. With a minimum amount of trial and error, a position will be found where the spit will not rotate from any position in which it is placed. When this occurs, the total load on the spit is balanced and the motor will drive the spit at an even speed. The center of gravity of the turkey or other meat item will often change during cooking because of loss of fat. If this occurs, the same procedure can be followed to rebalance the unit.

Because weight 25 is curved, it can be moved to the dotted line position shown in FIG. 2. In this dotted line position of FIG. 2, the weight 25 is substantially centered around the axis of spit 11. Because the weight 25 is at least partially distributed around spit 11, the amount of torque acting on spit 11 is considerably reduced. Although the form of weight shown in the drawing will not permit the torque on spit 11 to be completely eliminated, moving the weight to the dotted line position of FIG. 2 will substantially reduce the torque effect of the compensator on the spit. If it were desired to completely eliminate the torque effect without removing weight 25 from the compensator, the legs of weight 25 could be further lengthened so as to extend beyond spit 11 when in the dotted line position of FIG. 2. Therefore, by properly designing the size and configuration of the curved weight 25, its torque effect on the spit can be eliminated by moving it to a position adjacent collar 21.

FIG. 6 discloses another form of the invention wherein the sleeve 17 and the fixed collar 18 are formed as a single unit 29. The remainder of the structure is not changed.

Fixed collar 18 of the preferred embodiment provides some support for the movable collar 21 and also aids the operator in positioning collar 21. It is easier for the operator to position collar 21 if the operator does not need to be concerned about axial movements of the collar while he is positioning it. However, it is evident that collar 18 could be eliminated without departing from the invention if set screw 19 were simply threaded through sleeve 17.

The present invention can thus be mounted on any configuration of barbecue spit, and still provide minute adjustment of the compensator around the spit.

Most currently available barbecues provide minimal space between the handle and the side support for the spit. It would be advantageous if sufficient room between the handle and spit support were provided so that the weight compensator could be positioned outside of the spit support. This would permit the use of an insulating sleeve encasing sleeve 17. Then adjustment of the weight compensator could be accomplished without the use of insulating gloves as is the case when the compensator is directly over the coals as shown in FIG. 1. In some instances it is possible to remove the spit handle and replace it with the weight compensator.

What is claimed is:

1. A weight compensator for rotatable barbecue spits, comprising:
    a. a cylindrical sleeve having a bore which is larger than the widest cross dimension of the spit;
    b. means for removably securing said sleeve on the spit for rotation therewith, said spit extending through said bore;
    c. a first cylindrical collar mounted on said sleeve and freely rotatable around the circumference thereof;
    d. weight means;
    e. means including radially extending support means for securing said weight means to said collar and for adjusting the distance of said weight means from said collar; and
    f. means for releasably locking said collar to said sleeve at any selected position around the circumference thereof.

2. The apparatus of claim 1 including a second cylindrical collar mounted on said sleeve adjacent and coaxial with said first cylindrical collar, and a set screw extending through said second collar and said sleeve and threadably engaging at least one thereof to secure said sleeve on the spit.

3. The apparatus of claim 3 wherein said means for releasably locking said first collar on said sleeve is a set screw threadably extending through an opening therein.

4. The apparatus of claim 1 wherein said support means is a spoke-like metal rod having one end thereof secured to said first collar, and wherein said weight means is a curved metal weight mounted adjacent its center on said rod and having the opposite ends thereof positioned so as to curve generally around the spit when located close thereby.

5. The apparatus of claim 1 wherein said support means is a spoke-like rod having one end thereof secured to said first collar, and wherein said weight means is a segment of a generally circular metal ring, said segment being adjustably secured intermediate the ends of said segment to said rod.

6. The apparatus of claim 5 wherein the portion of said rod between said segment and said collar lies along a radius of said segment.

7. The apparatus of claim 6 wherein said segment has a rod receiving opening therein generally equidistant from the ends thereof, and means to releasably secure said segment to said rod at a selected position thereon.

8. A weight compensator for barbecue spits, comprising:
   a. a sleeve removably secured on the spit;
   b. a rotatable collar mounted on said sleeve;
   c. means for releasably locking said collar on said sleeve at any selected position around the circumference thereof;
   d. a spoke-like rod secured to said collar; and
   e. a weight comprising a segment of a generally circular metal ring adjustably mounted on said rod so that the portion of said rod between said segment and said collar lies along a radius of said segment.

9. In combination with a rotatable shaft, a counterbalance unit comprising:
   a. a sleeve removably mounted on the shaft for rotation therewith;
   b. a collar rotatably mounted on said sleeve;
   c. spoke-like support means secured to said collar;
   d. adjustable weight means mounted on said support means; and
   e. means for locking said collar to said sleeve at any selected position around the circumference thereof.

* * * * *